(No Model.)
G. W. PITTMAN.
WHEEL AND AXLE.
No. 344,543. Patented June 29, 1886.
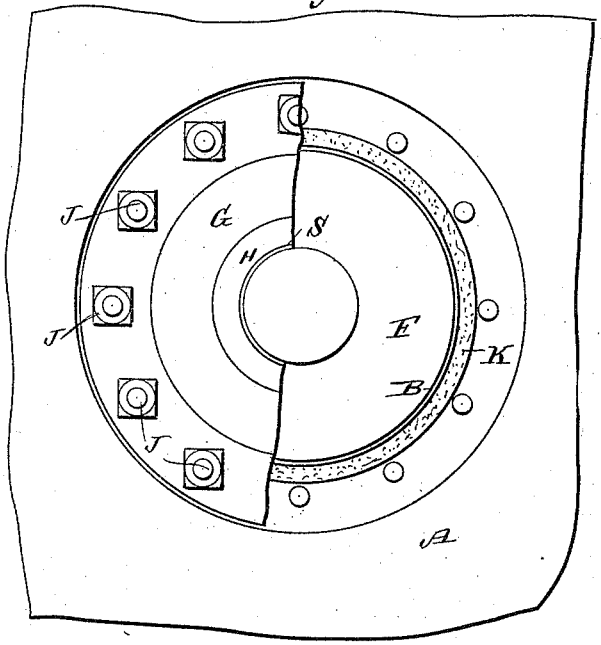
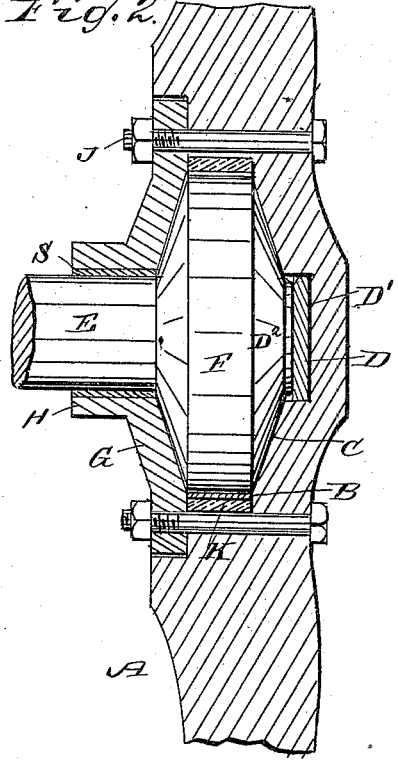
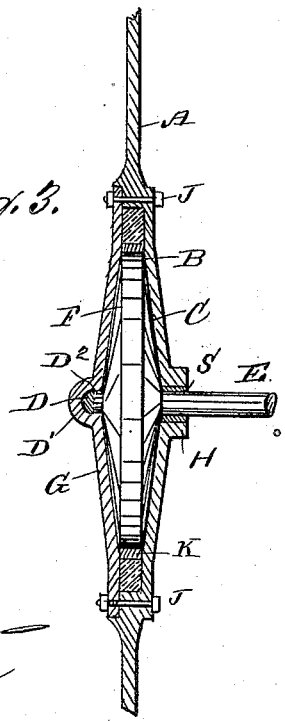
WITNESSES:
Theo. G. Hoster
C. Sedgwick
INVENTOR:
G. W. Pittman
BY Munn & Co.
ATTORNEYS.

UNITED STATES PATENT OFFICE.

GRANVILLE W. PITTMAN, OF KEOKUK, IOWA.

WHEEL AND AXLE.

SPECIFICATION forming part of Letters Patent No. 344,543, dated June 29, 1886.

Application filed August 31, 1885. Serial No. 175,810. (No model.)

*To all whom it may concern:*

Be it known that I, GRANVILLE W. PITTMAN, of Keokuk, in the county of Lee and State of Iowa, have invented a new and Improved Wheel, of which the following is a full, clear, and exact description.

The object of my invention is to provide a new and improved wheel, which runs easily, is cushioned well, and reduces the friction and increases the leverage power.

The invention consists in the peculiar construction and arrangement of parts, as hereinafter fully described, and pointed out in the claims.

Reference is to be had to the accompanying drawings, forming part of this specification, in which similar letters of reference indicate corresponding parts in all the figures.

Figure 1 is a detail face view of the central portion of my improved wheel, parts being broken out. Fig. 2 is a cross-sectional elevation of the same. Fig. 3 is a cross-sectional view of a modification.

The car-wheel A is provided in its inner side with a central circular opening, B, having a tapered bottom, C, and a central cavity, D, in the bottom for receiving a rubber cushion, D'.

On each end of the shaft or axle E a disk, F, is formed or rigidly mounted, and both faces of the said disk are made slightly conical, the outer face fitting against the conical bottom of the recess or cavity B, and having a central projection, D², resting against the cushion D'. An annular plate, G, shaped to fit against the disk F, and provided with a neck, H, for the axle E is placed in the recess in the inner side of the wheel, and is held in place by heavy bolts J. A cushion-collar, S, is held in neck H and on the axle E. A rubber ring, K, or any other like elastic ring is embedded in the circular recess in which the disk F revolves. If desired, a series of oil-holes may be provided to conduct grease or oil into the cavity D.

As shown in Fig. 3, the neck H, with its cushion, may be formed on the wheel and the cavity D in the plate G; but in all cases the wheel is put together in the same manner, and one construction in all respects the equivalent of the other. Mounting the wheel on the axle is greatly facilitated, as the wheel can easily be removed from or replaced on the axle after removing the plate H. The hubs of carriage-wheels, &c., can be constructed in the same manner.

The special advantage of my device is that an increased leverage-power is obtained by bringing the weight and the fulcrum nearer together, and at the same time largely increasing the lever from the piston-pin to weight, and all this without any loss of speed or motion. The other feature is that the wheel is perfectly cushioned.

Having thus described my invention, I claim as new and desire to secure by Letters Patent—

1. The combination, with the axle E, provided with the disk F, having conical faces, and a central projection, D², of the wheel A, provided with the circular opening B, having a tapering bottom and a central cavity, D, in said bottom, the plate G, secured to the wheel and having a concave inner face to fit against the conical face of the disk, and the cushion D' in the cavity D, substantially as herein shown and described.

2. The combination, with the axle E, provided with the conical disk F on its end, and the central projection, D², of the wheel A, provided with the circular opening B, having the tapered bottom C and the central cavity, D, the cushion D' in said cavity, the cushion K in the opening B, the plate G, having the neck H, and the bolts J, substantially as herein shown and described.

GRANVILLE W. PITTMAN.

Witnesses:
- GEO. W. NEWMAN,
- H. H. GILLIAM.